*(12)* United States Patent
Kondo

*(10)* Patent No.: US 8,293,835 B2
*(45)* Date of Patent: Oct. 23, 2012

(54) METHOD FOR PREPARING SILICONE COMPOSITION

(75) Inventor: Takashi Kondo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 299 days.

(21) Appl. No.: 12/836,912

(22) Filed: Jul. 15, 2010

(65) Prior Publication Data

US 2011/0015305 A1 Jan. 20, 2011

(30) Foreign Application Priority Data

Jul. 16, 2009 (JP) ................. 2009-167944

(51) Int. Cl.
*B28C 5/24* (2006.01)
(52) U.S. Cl. ............... 524/588; 366/53; 366/54; 366/56; 366/92; 366/94; 366/144; 366/219; 366/224; 366/225; 366/230; 366/231; 366/348
(58) Field of Classification Search ................ None
See application file for complete search history.

(56) References Cited

U.S. PATENT DOCUMENTS

| | | | |
|---|---|---|---|
| 6,001,917 A | | 12/1999 | Takahashi et al. |
| 6,177,506 B1 * | | 1/2001 | Takahashi et al. ............ 524/588 |
| 7,960,449 B2 * | | 6/2011 | Ulzheimer .................... 523/212 |
| 2007/0282036 A1 | | 12/2007 | Ulzheimer |

FOREIGN PATENT DOCUMENTS

| | | | |
|---|---|---|---|
| GB | 761 614 | * | 11/1956 |
| GB | 2 384 488 A | | 7/2003 |
| JP | 11-012368 A | | 1/1999 |
| JP | 11-106657 A | | 4/1999 |
| JP | 4155718 B2 | | 9/2008 |

OTHER PUBLICATIONS

Office Action issued Oct. 12, 2011, in Japanese Patent Application No. 2009-167944.
"Mixing principle: The quality of your end product can never be better than the quality of your mixture," [Online] Feb. 21, 2007, XP 002612519; Retreived from the Internet: URL:http://www.eirich.com/en/mixers> [retrieved Dec. 2, 2010].
Search Report issued Dec. 22, 2010, in European Patent Application No. 10007251.

* cited by examiner

*Primary Examiner* — Marc Zimmer
(74) *Attorney, Agent, or Firm* — Birch, Stewart, Kolasch & Birch LLP

(57) ABSTRACT

A silicone composition comprising an organopolysiloxane containing at least two silicon-bonded alkenyl and/or hydroxyl groups in the molecule and a filler having a BET surface area of at least 10 $m^2/g$ is prepared by kneading the components in a batchwise high-shear mixer. The mixer includes a rotatable mixing pan (1), a high-speed rotation agitator (3) disposed eccentrically in the pan, and a stationary scraper (4) disposed in the pan for creating a vertical counterflow.

9 Claims, 1 Drawing Sheet

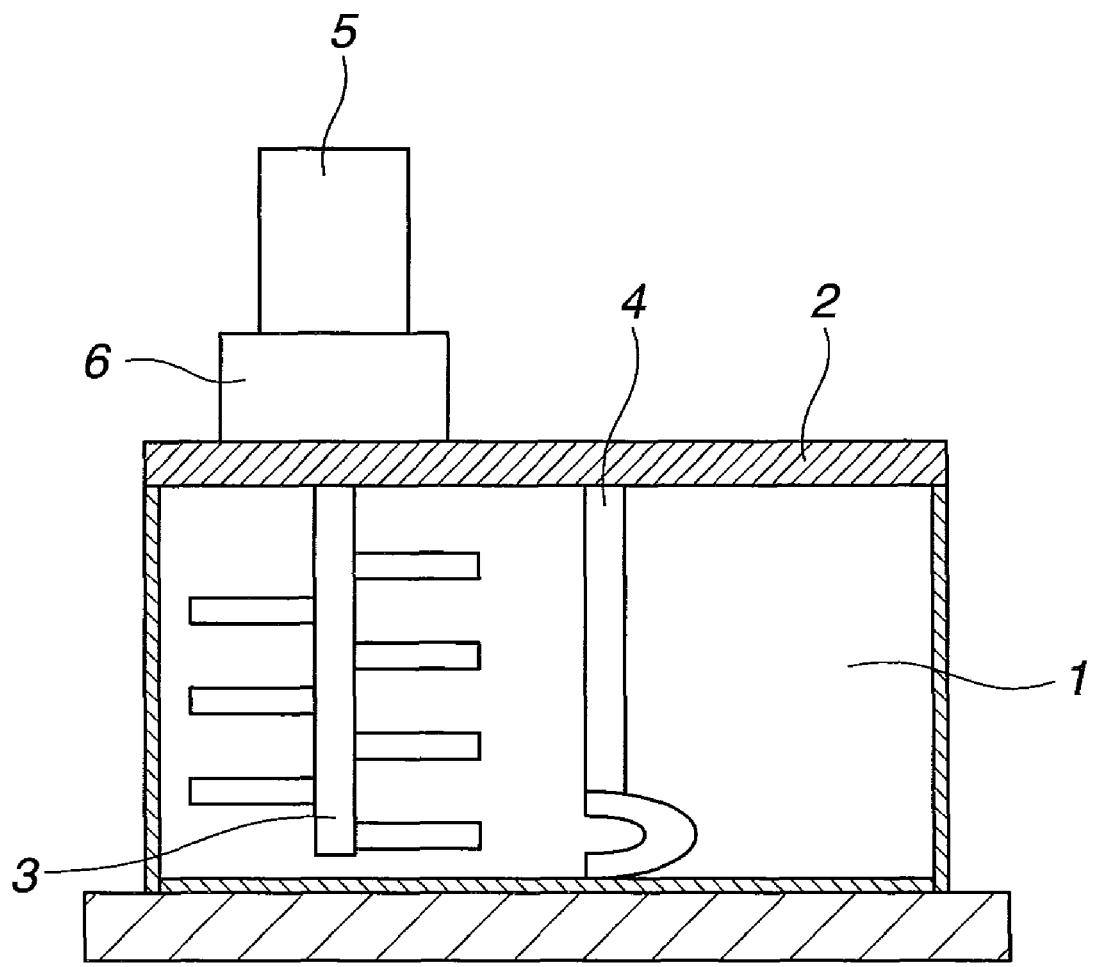

METHOD FOR PREPARING SILICONE COMPOSITION

CROSS-REFERENCE TO RELATED APPLICATION

This non-provisional application claims priority under 35 U.S.C. §119(a) on Patent Application No. 2009-167944 filed in Japan on Jul. 16, 2009, the entire contents of which are hereby incorporated by reference.

TECHNICAL FIELD

This invention relates to a method for preparing a silicone composition simply by brief kneading, and more particularly, to a method for preparing a silicone composition simply in a short time, the composition being suited for use in electric and electronic parts, automobiles, business machines, and health care products.

BACKGROUND ART

For the industrial manufacture of silicone polymer/reinforcing filler compounds, batchwise large-size mixers, for example, kneaders having two sigma blades and planetary mixers are often used in the art. For the continuous manufacture, twin-screw continuous extruder/kneaders are used. Under the current circumstances, it is desired from cost considerations to produce a compound of consistent quality at a high productivity and a low basic unit for energy.

The batchwise mixers mentioned above are able to produce compounds of consistent quality, but take a very long time in powder mixing if the filler has a high bulk density. The overall process time including powder mixing, heating and heat treatment is prolonged. Productivity may be increased using a mixing vessel of a large volume, which requires an accordingly higher power for operation, leaving the problem of increased energy consumption.

JP 4155718 discloses a method for producing a liquid silicone rubber base using two twin-screw continuous kneader/extruder units. This method meets high productivity and other requirements, but suffers from quality consistency because of problems in metering, feeding, and pumping of the filler. When the system is required to accommodate compositions of different type, problems arise because cleaning and switching are difficult, the overall process becomes complex, and more accessories must be attached to increase the initial investment. There is a desire to have a method for preparing a silicone composition at a high productivity while obviating these drawbacks.

CITATION LIST

Patent Document 1: JP 4155718 (GB 2384488A)

SUMMARY OF INVENTION

An object of the invention is to provide a method for briefly preparing a silicone composition of consistent quality, the method being capable of accommodating compositions of different type.

The inventor have found that a silicone composition comprising an organopolysiloxane containing at least two silicon-bonded alkenyl and/or hydroxyl groups in the molecule and a filler having a BET surface area of at least 10 m²/g as essential components can be effectively prepared by kneading the components in a batchwise high-shear mixer comprising a rotatable mixing pan, a high-speed rotation agitator disposed eccentrically in the pan, and a stationary scraper disposed in the pan for creating a vertical counterflow.

The invention provides a method for preparing a silicone composition comprising an organopolysiloxane containing at least two silicon-bonded alkenyl groups and/or at least two silicon-bonded hydroxyl groups in the molecule and a filler having a BET surface area of at least 10 m²/g as essential components, the method comprising the step of kneading the components in a batchwise high-shear mixer, the mixer comprising a mixing pan which itself rotates, a high-speed rotation agitator or impeller disposed eccentrically in the pan, and a stationary scraper disposed in the pan for creating a vertical counterflow.

In a preferred embodiment, the kneading step includes mixing a 30 to 100% by weight fraction of the organopolysiloxane and the entirety of the filler in the mixing pan while rotating the mixing pan at 10 to 100 rpm and the agitator at 100 to 1,000 rpm, heat treating the mixture at 120 to 270° C. while rotating the mixing pan at 10 to 100 rpm and the agitator at 200 to 4,000 rpm, and feeding the remainder of the organopolysiloxane, if any, to the mixture prior to and/or subsequent to the heat treatment. In a more preferred embodiment, the heat treatment is under a reduced pressure of up to 300 Torr.

In a preferred embodiment, a dispersant for the filler is fed during the kneading step. The dispersant is preferably one or more compound selected from silazane compounds and silanol-containing compounds. More preferably, the dispersant is 1,1,1,3,3,3-hexamethyldisilazane or a compound of $HO(SiR^1{}_2O)_nH$ wherein $R^1$ is a monovalent hydrocarbon group of 1 to 10 carbon atoms and n is an integer of 1 to 50.

The filler is typically fumed silica, precipitated silica or a mixture thereof.

In a preferred embodiment, the composition comprises 100 parts by weight of the organopolysiloxane and 10 to 130 parts by weight of the silica filler.

ADVANTAGEOUS EFFECTS OF INVENTION

The method of the invention involves mixing and kneading components of a silicone composition on the specific batchwise high-shear mixer and permits the filler, which is difficulty admixed with the organopolysiloxane component when a conventional batchwise mixer such as a kneader is used, to be intimately mixed within a short time even at a heavy loading. The silicone composition which has a good fluidity and satisfies the desired physical properties of the final product can be prepared through simple steps within a short time, at a high efficiency and a low cost. In addition, the method can accommodate silicone compositions of different type. An additional advantage is an improvement in the basic unit for energy.

BRIEF DESCRIPTION OF DRAWINGS

FIG. 1 schematically illustrates one exemplary batchwise high-shear mixer used in the method of the invention.

DESCRIPTION OF EMBODIMENTS

The invention provides a method for preparing a silicone composition comprising an organopolysiloxane containing at least two silicon-bonded alkenyl groups and/or at least two silicon-bonded hydroxyl groups in the molecule and a filler having a BET surface area of at least 10 m²/g as essential components.

The organopolysiloxane containing at least two silicon-bonded alkenyl groups and/or at least two silicon-bonded hydroxyl groups in the molecule preferably has the following average compositional formula (1):

$$R_aSiO_{(4-a)/2} \quad (1)$$

wherein R is a substituted or unsubstituted monovalent hydrocarbon group bonded to the silicon atom, and "a" is a positive number of 1.8 to 2.2.

In formula (1), R is selected from substituted or unsubstituted monovalent hydrocarbon groups, typically substituted or unsubstituted alkyl, cycloalkyl, alkenyl, aryl, and aralkyl groups of 1 to 12 carbon atoms. Examples include alkyl groups such as methyl, ethyl, n-propyl, isopropyl, n-butyl, tert-butyl, pentyl and hexyl, cycloalkyl groups such as cyclohexyl and cycloheptyl, alkenyl groups such as vinyl and allyl, aryl groups such as phenyl and naphthyl, aralkyl groups such as benzyl and phenylethyl, and substituted forms of the foregoing in which some or all hydrogen atoms are replaced by halogen atoms (e.g., fluoro, chloro), cyano or other radicals. R may also be a hydroxyl group. Inter alia, methyl, phenyl, trifluoropropyl and hydroxyl groups are preferred, and the preferred alkenyl is vinyl. The subscript "a" is a positive number of 1.8 to 2.2.

Since the organopolysiloxane is mainly cured into a silicone rubber through addition reaction known as hydrosilylation, radical reaction with the aid of organic peroxides, or condensation reaction, it should contain at least two silicon-bonded alkenyl groups in the molecule or at least two silicon-bonded hydroxyl groups in the molecule or both.

The organopolysiloxane preferably has a linear structure and may partially contain a branched structure. Also preferably the organopolysiloxane is capped at either end with an alkenyl group and/or a hydroxyl group.

Further preferably the organopolysiloxane has a viscosity of 50 to 5,000,000 mm$^2$/s, more preferably 100 to 1,000,000 mm$^2$/s at 25° C. Note that the viscosity is a kinematic viscosity as measured by an Ostwald viscometer. A mixture of organopolysiloxanes having different viscosity or molecular structure may be used.

Another essential component is a filler having a specific surface area of at least 10 m$^2$/g, preferably 50 to 400 m$^2$/g as measured by the BET method. Examples of the filler include fumed silica, precipitated silica, calcium carbonate, and carbon black, with the fumed silica and precipitated silica being preferred. The fillers may be used alone or in admixture of two or more.

The amount of the filler compounded may be determined as appropriate depending on the type and surface area of a particular filler. Typically the amount of the filler is 10 to 130 parts, preferably 20 to 100 parts by weight relative to 100 parts by weight of the organopolysiloxane. For example, fumed silica having a surface area of 300 m$^2$/g may be compounded in an amount of 20 to 70 parts, preferably 30 to 60 parts by weight on the same basis. The minimum amount of the filler added may correspond to the proportion of the filler in the silicone composition to be prepared while the maximum amount of the filler added may be limited by the level above which mixing on the mixer is impossible and which depends on the type and surface area of a particular filler.

In the method of the invention, a dispersant may be added along with the essential components for facilitating mixing of the filler. The dispersant is preferably selected from silazane compounds, silanol-containing compounds, and mixtures thereof. Suitable silazane compounds include 1,1,1,3,3,3-hexamethyldisilazane, 1,3-divinyl-1,1,3,3-tetramethyldisilazane, and bis(N,N'-trimethylsilylamino)methylvinylsilane. Suitable silanol-containing compounds include compounds of HO(SiR$^1_2$O)$_n$H wherein R$^1$ is a monovalent hydrocarbon group of 1 to 10 carbon atoms, for example, alkyl (e.g., methyl, ethyl), aryl, aralkyl, or alkenyl, preferably alkyl, most preferably methyl, and n is an integer of 1 to 50, preferably 3 to 25. The preferred dispersants are 1,1,1,3,3,3-hexamethyldisilazane, and α,ω-diorganosiloxane diols and trimethylsilanols having a degree of polymerization of up to 50.

An appropriate amount of the dispersant added is up to 10 parts, more preferably 0 to 5 parts by weight relative to 100 parts by weight of the organopolysiloxane. More than 10 parts of the dispersant may be costly and adversely affect the final physical properties of the resulting composition. The amount of the dispersant, when used, is preferably at least 1 part by weight.

It is acceptable to add other additives which are well known to be compounded in conventional silicone compositions. Suitable additives include plasticizers, for example, diorganopolysiloxanes free of functional groups such as alkenyl or hydroxyl, for example, dimethylpolysiloxane.

Water may be added in an amount of 0 to 5 parts, preferably 0 to 3 parts by weight relative to 100 parts by weight of the organopolysiloxane for the purpose of promoting hydrolysis. The amount of water, when added, is preferably at least 0.5 part by weight.

According to the invention, the essential and optional components described above are mixed in a batchwise high-shear mixer. The mixer should include a mixing pan which itself rotates, a high-speed rotation agitator disposed eccentrically in the pan, and a stationary scraper disposed in the pan, wherein the mixing pan and the agitator cooperate to achieve high-shear mixing during rotation while the scraper serves to create a vertical counterflow. This provides for high efficiency kneading/mixing operation.

Referring to FIG. 1, one exemplary batchwise high-shear mixer is illustrated. The mixer includes a mixing pan 1 which itself is rotatable, a lid 2 fitted atop the pan 1, and a high-speed rotation agitator 3 disposed and off-centered within the pan 1 for rotation. An electric motor 5 and a bearing box 6 are arranged outside the pan. The agitator 3 is coupled to the motor 5 via a belt (not shown) so that the agitator may be driven for rotation. The rotational orientation of the agitator may be identical with or opposite to the rotational orientation of the mixing pan, and a choice may be made depending on the viscosity of a mixture being mixed or the like.

The mixer further includes a stationary scraper 4 disposed substantially at the center in the pan and inside the lid 2. The scraper 4 functions to prevent agglomeration of the contents and to create a vertical counterflow in the contents, contributing to high-efficiency mixing. While the mixing pan is generally arranged horizontally, it may be arranged at an angle of inclination so as to facilitate efficient mixing, depending on the nature of the contents being mixed.

Such a batchwise high-shear mixer is commercially available under the trade name of Intensive Mixer from Eirich GmbH. This mixer has the features of the above-mentioned mixer. Specifically, the Intensive Mixer includes a mixing pan which itself is rotatable, a high-speed rotation agitator disposed eccentrically within the pan, and a stationary scraper wherein the rotating pan and agitator cooperate to achieve high-shear mixing, which is combined with a vertical counterflow created by the scraper, to achieve high-efficiency kneading and mixing.

According to the invention, a silicone composition is obtained by charging the mixing pan of the batchwise high-shear mixer with the liquid component, rotating the mixing pan, and rotating the agitator simultaneously, feeding the filler and optional additives, thereby mixing the components.

Specifically, the silicone composition is obtained by first feeding the organopolysiloxane and the reinforcing filler to the mixing pan of the high-shear mixer, and optionally adding the dispersant thereto. The entire amount of the organopolysiloxane may be fed at a time. Alternatively, a fraction of the organopolysiloxane may be fed, and the remainder be fed after the fraction has been mixed with the filler. The fraction of the organopolysiloxane which is initially fed is 30 to 100% by weight of the entire amount, preferably 30 to 80% by weight, and more preferably 40 to 60% by weight of the entire amount.

The reinforcing filler may be fed at the same time as the organopolysiloxane or after the organopolysiloxane has been fed. The entire amount of the filler may be fed at a time, or it may be fed in divided portions, typically 2 to 10 divided portions.

Once the components are fed into the mixing pan, the motor is actuated to rotate the mixing pan and the agitator at the same time, thereby kneading the components. This kneading operation permits the filler to be intimately mixed with the organopolysiloxane within a short time even at a heavy loading. This is quite unexpected from the fact that the filler is difficultly mixed with the organopolysiloxane component when a conventional batchwise mixer such as a kneader is used.

In a preferred embodiment, the kneading step includes mixing a 30 to 100% by weight fraction of the organopolysiloxane and the entirety of the filler in the mixing pan while rotating the mixing pan at 10 to 100 rpm and the agitator at 100 to 1,000 rpm; heat treating the mixture at 120 to 270° C. while rotating the mixing pan at 10 to 100 rpm and the agitator at 200 to 4,000 rpm; and feeding the remainder of the organopolysiloxane to the mixture prior to and/or subsequent to the heat treatment, if any, i.e., if the entirety of the organopolysiloxane is not fed in the mixing step.

Specifically, once the filler is added to the organopolysiloxane in the mixing pan, mixing is effected by rotating the mixing pan at 10 to 100 rpm, more preferably 10 to 40 rpm and also rotating the agitator at 100 to 1,000 rpm, more preferably 100 to 400 rpm. Rotation at a higher speed is effective in reducing the mixing time, but in case where the dispersant is used, the dispersant can be decomposed or volatilized by the heat generated by rotation. Thus the rotational frequency of the agitator is desirably controlled to 100 to 400 rpm. Usually the mixing time is 20 to 240 minutes, preferably 30 to 120 minutes.

When the organopolysiloxane and filler are fed to the mixing pan, the pan is preferably under atmospheric or reduced pressure. When the filler is added in divided portions, agitation need not be stopped whenever a portion is added, and the pan is preferably kept under atmospheric or reduced pressure.

Once the filler is mixed with the organopolysiloxane, the rotational frequency of the agitator is increased to elevate the liquid temperature to the predetermined level. Specifically, the rotational frequency of the agitator is desirably 200 to 4,000 rpm, more desirably 400 to 3,800 rpm, though it depends on the viscosity of the liquid. At less than 200 rpm, heating must be slower and thus takes a longer time, leading to a longer process time. Rotation above 4,000 rpm may cause a temperature ramp and require a higher load to the drive system.

Since the mixer used herein is designed so as to apply a very high shear to the contents, only the heat of agitation of the agitator is sufficient to provide a temperature rise. A desired temperature rise can occur in the mixing pan without a need for an external heater or heating jacket. Thus the amount of energy used in production is reduced, and a production process contributing to energy saving is available.

Once the liquid temperature is elevated to the desired range by the heating step, heat treatment is effected while maintaining the temperature range. The means for maintaining the temperature range may include control of the rotational frequency of the agitator, feed of cool inert gas, and water feed. The heat treatment temperature is preferably in the range of 120 to 270° C., more preferably 150 to 250° C. A temperature below 120° C. may cause insufficient volatilization of residues or insufficient interaction between the organopolysiloxane and the filler, resulting in a mixture experiencing substantial changes of properties with time. A temperature above 270° C. may cause troubles such as gelation due to cleavage of the molecular chain of the organosiloxane polymer and re-crosslinking. The heat treatment may be effected under atmospheric pressure or preferably under reduced pressure which is convenient in that volatilization of residues is completed in a short time. The reduced pressure is specifically 300 Torr or lower. The heat treatment time is usually 20 to 240 minutes, preferably 30 to 120 minutes.

In case where only a fraction of the organopolysiloxane rather than its entirety is fed in the mixing step, the remainder of the organopolysiloxane is fed to the mixture after the powder mixing or after the heat treatment. Then mixing is preferably continued at 100 to 400 rpm for 2 to 10 minutes.

The silicone composition obtained by the above method is useful, for example, as a base compound for liquid silicone rubber compositions. In such an example, suitable components such as a crosslinking agent, curing agent and pigment paste are added to the silicone composition to formulate a liquid silicone rubber composition.

Example

Examples of the invention are given below by way of illustration and not by way of limitation. In Examples, all parts are by weight, the viscosity of an elastomer is an absolute viscosity measured at 23° C. by a rotational viscometer, the viscosity of a fluid is a measurement at 25° C. as previously defined. The batchwise high-shear mixer used herein has an effective mixing volume of 5 L and a belt drive coupled to an electric motor with a power of 3.7 kW.

Example 1

To a mixing pan of a batchwise high-shear mixer as shown in FIG. 1 were fed 60 parts (1,500 g) of a linear dimethylpolysiloxane #1 capped with a dimethylvinylsilyl group at either end of its molecular chain and having a viscosity of 30,000 $mm^2/s$ as a base polymer, 8 parts (200 g) of 1,1,1,3,3,3-hexamethyldisilazane, and 2 parts (50 g) of water. Then 40 parts (1,000 g) of fumed silica having a BET surface area of 300 $m^2/g$ was fed, and the contents were mixed by rotating the mixing pan at 42 rpm and the agitator at 400 rpm. Powder mixing took 17 minutes, and agitation was continued for a further 10 minutes.

Subsequently, 24.5 parts (612.5 g) of linear dimethylpolysiloxane #1 and 5 parts (125 g) of dimethylpolysiloxane containing 5 mol % of vinyl in side chain as a hardness regulator were fed to the mixture, which was mixed for 5 minutes. Thereafter, the rotational frequency was increased to 1,600 rpm whereupon the temperature started rising.

A temperature rise occurred simply by increasing the rotational frequency to 1,600 rpm, without a need for external heat. Once the temperature of 170° C. was reached, the rotational frequency was controlled in the range of 400 to 1,600 rpm so that the temperature might be held in the range of 170 to 200° C. The mixture was held in the temperature range for 60 minutes.

The silicone composition thus obtained appeared colorless and transparent without any agglomerates of the filler or defective dispersion of gel or unwanted matter and showed a uniform flow behavior. Mixing was completed within a short time, as demonstrated by an overall process time of 103 minutes.

Example 2

Feeding and mixing steps were the same as in Example 1 except that the heat treating/temperature holding step continued for 30 minutes at a rotational frequency of 1,600 rpm while cooling by water addition. Once the temperature of 190° C. was reached, water was repeatedly added in small portions for cooling so as to control the temperature in the range of 170 to 200° C. Like Example 1, the silicone composition obtained appeared colorless and transparent without any agglomerates of the filler or defective dispersion of gel or unwanted matter and showed a uniform flow behavior. Mixing was completed within a short time, as demonstrated by an overall process time of 66 minutes.

Example 3

Feeding and mixing steps were the same as in Example 1 except that the heat treating/temperature holding step continued for 60 minutes under a reduced pressure of 37 Torr. Like Example 1, the silicone composition obtained appeared colorless and transparent without any agglomerates of the filler or defective dispersion of gel or unwanted matter and showed a uniform flow behavior. Mixing was completed within a short time, as demonstrated by an overall process time of 101 minutes.

Comparative Example 1

Using a kneader (total volume 12 L, sigma-blade double-cylinder kneader, built-in electric heater) which is commonly used as a batchwise kneader in the manufacture of silicone compositions, the same components as in Example 1 were kneaded. To a mixing vessel were fed 60 parts (2,700 g) of linear dimethylpolysiloxane #1, 8 parts (360 g) of 1,1,1,3,3,3-hexamethyldisilazane, and 2 parts (90 g) of water, and then 40 parts (1,800 g) of the fumed silica. Silica mixing took 50 minutes. The mixture was then heated. Heating took 60 minutes until the predetermined temperature of 170° C. was reached. Thereafter mixing was continued for 3 hours while holding at the temperature. Subsequently, 24.5 parts (612.5 g) of linear dimethylpolysiloxane #1 and 5 parts (125 g) of dimethylpolysiloxane containing 5 mol % of vinyl in side chain were fed to the mixture, which was mixed until uniform. The overall process time including the heat treating/temperature holding step was 353 minutes.

The silicone composition thus obtained appeared colorless and transparent, and agglomerates of the filler and defective dispersion of gel or unwanted matter were observed.

Comparative Example 2

Using a planetary mixer (total volume 10 L, built-in electric heater) which is commonly used as a batchwise kneader in the manufacture of silicone compositions, the same components as in Example 1 were kneaded. To a mixing vessel were fed 60 parts (2,700 g) of linear dimethylpolysiloxane #1, 8 parts (360 g) of 1,1,1,3,3,3-hexamethyldisilazane, and 2 parts (90 g) of water, and then 40 parts (1,800 g) of the fumed silica. Silica mixing took 65 minutes. The mixture was then heated. Heating took 95 minutes until the predetermined temperature of 170° C. was reached. Thereafter mixing was continued for 3 hours while holding at the temperature. Subsequently, 24.5 parts (612.5 g) of linear dimethylpolysiloxane #1 and 5 parts (125 g) of dimethylpolysiloxane containing 5 mol % of vinyl in side chain were fed to the mixture, which was mixed until uniform. The overall process time including the heat treating/temperature holding step was 430 minutes.

The silicone composition thus obtained appeared white and opaque, and agglomerates of the filler and defective dispersion of gel or unwanted matter were observed.

Each of the silicone compositions obtained in Examples 1 to 3 and Comparative Examples 1, 2 was dispersed again on a three-roll mill, and components as shown in Table 1 were added and mixed in a 5-L universal mixer. There were prepared two-part silicone rubber compositions (parts A and B). It is noted that the linear dimethylpolysiloxane added at this point is the same as used in Examples and Comparative Examples.

The viscosity of parts A and B was measured. Parts A and B were combined in a weight ratio of 100/100 to form a composition, which was cured at 150° C. for 10 minutes into a rubber sheet before physical properties of the cured mixture (rubber sheet) were determined. The results are shown in Table 2.

TABLE 1

| | | Part A (g) | Part B (g) |
|---|---|---|---|
| Formulation | Silicone composition | 2,560 | 2,560 |
| | Linear dimethylpolysiloxane #1 | 160 | 160 |
| | Organopolysiloxane*[1] | 240 | 80 |
| | Pt catalyst*[2] | 4.0 | — |
| | Ethynylcyclohexanol | — | 2.2 |
| | Organohydrogenpolysiloxane*[3] | — | 140 |

*[1] viscosity 700 mm$^2$/s (25° C.), Si-Vi equivalent 0.135 mol/100 g
*[2] platinum concentration 1 wt %
*[3] viscosity 17 mm$^2$/s (25° C.), Si—H equivalent 0.00694 mol/g

TABLE 2

| | | | Example | | | Comparative Example | |
|---|---|---|---|---|---|---|---|
| | | | 1 | 2 | 3 | 1 | 2 |
| Viscosity @23° C. (BS-7-10) | A | (Pa · s) | 511 | 534 | 505 | 620 | 1,150 |
| | B | (Pa · s) | 632 | 623 | 602 | 593 | 1,200 |
| Curability @130° C. | $T_{10}$ | (sec) | 49 | 46 | 44 | 45 | 61 |
| | $T_{50}$ | (sec) | 73 | 70 | 67 | 68 | 83 |
| | $T_{90}$ | (sec) | 102 | 99 | 97 | 98 | 120 |

TABLE 2-continued

|  | Example | | | Comparative Example | |
|---|---|---|---|---|---|
|  | 1 | 2 | 3 | 1 | 2 |
| Density @23° C. | 1.13 | 1.13 | 1.13 | 1.13 | 1.13 |
| Hardness (Type A) | 53 | 52 | 51 | 49 | 65 |
| Tensile strength (MPa) | 7.0 | 8.4 | 8.5 | 7.7 | 5.2 |
| Elongation at break (%) | 420 | 510 | 530 | 480 | 250 |
| Tear strength, crescent (kN/m) | 36 | 38 | 37 | 33 | 23 |
| Tear strength, angle (kN/m) | 37 | 35 | 35 | 41 | 26 |

Physical properties were determined under the following conditions.

Viscosity: Brookfield rotational viscometer, rotor No. 7, after 3 minutes at 10 rpm Curability: A torque was measured using an oscillating disc rheometer (Toyo Seiki Seisakusho Ltd.) under conditions: temperature 130° C., torque range 100 kg-cm, and oscillating angle ±3°. Provided that the torque after 2 minutes was 100, times $T_{10}$, $T_{50}$ and $T_{90}$ taken until the torque became 10, 50 and 90 were measured.

Density: water displacement according to JIS K-6249

Tensile strength: JIS K-6249

Elongation at break: JIS K-6249

Tear strength, crescent: JIS K-6249

Tear strength, angle: JIS K-6249

Example 4

To a mixing pan of a batchwise high-shear mixer as shown in FIG. 1 were fed 40 parts (1,440 g) of a linear dimethylpolysiloxane #2 capped with a hydroxyl group at either end of its molecular chain and having a viscosity of 5,000 mm²/s, 20 parts (720 g) of a linear polysiloxane #3 capped with a hydroxyl group at either end of its molecular chain and having a viscosity of 20,000 mm²/s, and 10 parts (360 g) of a dimethylpolysiloxane #4 capped with a trimethylsilyl group at either end of its molecular chain and having a viscosity of 100 mm²/s as base polymers, and 3 parts (108 g) of dimethylpolysiloxane capped with a hydroxyl group at either end of its molecular chain and having a degree of polymerization of about 20 as a dispersant. The contents were agitated at 400 rpm for 5 minutes. Then 14 parts (504 g) of fumed silica having a BET surface area of 200 m²/g was fed, and the contents were mixed by rotating the mixing pan at 42 rpm and the agitator at 950 rpm. Powder mixing was completed within a very short time of 7 minutes. The rotational frequency was increased to 4,000 rpm to elevate the temperature to 170° C. There was no need for external heat.

Under these conditions, mixing was continued for 30 minutes as the heat treating/temperature holding step. The ultimate temperature was 230° C. Thereafter, 16 parts of dimethylpolysiloxane #3 was added, and the contents were agitated at 950 rpm for 5 minutes to complete the process. Mixing was completed within a short time, as demonstrated by an overall process time of 57 minutes.

The silicone composition thus obtained appeared milky white and semitransparent without any agglomerates of the filler or defective dispersion of gel or unwanted matter and showed a uniform flow behavior.

Example 5

A silicone composition was prepared as in Example 4 except that 0.1 part (3.6 g) of 1,1,1,3,3,3-hexamethyl-disilazane was added to the composition of Example 4 as a second dispersant. Mixing was completed within a short time, as demonstrated by an overall process time of 51 minutes.

The silicone composition thus obtained appeared milky white and semitransparent without any agglomerates of the filler or defective dispersion of gel or unwanted matter and showed a uniform flow behavior. A drop of viscosity was observed immediately after the silica addition, and the finished composition had a low viscosity and satisfactory properties.

Comparative Example 3

Using a Henschel mixer (total volume 10 L, built-in electric heater) as a batchwise mixer, a silicone composition was prepared from the same components and amounts as in Example 4. Silica mixing took 35 minutes. The contents were then heated, and heating took 60 minutes until the temperature reached 170° C. The overall process time including the heat treating/temperature holding time was 210 minutes.

The silicone composition thus obtained appeared milky white and semitransparent, and agglomerates of the filler and defective dispersion of gel or unwanted matter were observed.

Each of the silicone compositions obtained in Examples 4, 5 and Comparative Example 3 was dispersed again on a three-roll mill, and components as shown in Table 3 were added and mixed in a 5-L universal mixer. There were prepared one-part silicone rubber compositions. It is noted that the linear dimethylpolysiloxane #5 added at this point is the same as used in Examples 4, 5 and Comparative Example 3.

The viscosity of the rubber composition was measured. The composition cured at 23° C. for 7 days into a rubber sheet before physical properties of the cured mixture (rubber sheet) were determined. The results are shown in Table 4.

TABLE 3

|  |  | Amount (g) |
|---|---|---|
| Formulation | Silicone composition | 2,610 |
|  | Linear dimethylpolysiloxane #5 | 45 |
|  | Organopolysiloxane*⁴ | 150 |
|  | Vinylisopropenoxysilane | 180 |
|  | 1,1,3,3-Tetramethyl-2-[3-(trimethoxysilyl)-propyl]guanidine | 22.5 |
|  | γ-Aminopropyltrimethoxysilane | 30 |
|  | Dibutyltin dioctoate | 1.2 |

*⁴viscosity 1,500 mm²/s (25° C.), hydroxyl at both ends

TABLE 4

|  | Example | | Comparative Example |
| --- | --- | --- | --- |
|  | 4 | 5 | 3 |
| Tack-free time (min) | 3 | 3 | 4 |
| Viscosity @23° C. (BS-7-10) (Pa · s) | 38 | 42 | 40 |
| Density @23° C. | 1.06 | 1.06 | 1.06 |
| Hardness (Type A) | 27 | 28 | 29 |
| Tensile strength (MPa) | 2.4 | 2.6 | 2.6 |
| Elongation at break (%) | 320 | 300 | 320 |
| Shear bond strength (Al/Al) (MPa) | 0.9 | 0.9 | 1.3 |
| Cohesive failure (%) | 100 | 80 | 100 |

Physical properties were determined under the following conditions.

Tack-free time: JIS A-1439

Hardness: Type A hardness according to JIS K-6249

Shear bond strength and Cohesive failure:

Using aluminum plates of 25 mm width and 100 mm length, a shear test specimen having a bond area of 2.5 mm$^2$ and a bond thickness of 2 mm was prepared. It was aged at 23° C. and 50% RH for 7 days prior to the longitudinal shear test.

The viscosity, density, tensile strength and elongation at break were determined as in Table 2.

Japanese Patent Application No. 2009-167944 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a silicone composition comprising an organopolysiloxane containing at least two silicon-bonded alkenyl groups and/or at least two silicon-bonded hydroxyl groups in the molecule and a filler having a BET surface area of at least 10 m$^2$/g as essential components, the method comprising the step of kneading the components in a batchwise high-shear mixer, the mixer comprising a mixing pan which itself rotates, a high-speed rotation agitator disposed eccentrically in the pan, and a stationary scraper disposed in the pan for creating a vertical counterflow.

2. The method of claim 1 wherein the kneading step includes mixing a 30 to 100% by weight fraction of the organopolysiloxane and the entirety of the filler in the mixing pan while rotating the mixing pan at 10 to 100 rpm and the agitator at 100 to 1,000 rpm, heat treating the mixture at 120 to 270° C. while rotating the mixing pan at 10 to 100 rpm and the agitator at 200 to 4,000 rpm, and feeding the remainder of the organopolysiloxane, if any, to the mixture prior to and/or subsequent to the heat treatment.

3. The method of claim 2 wherein the heat treatment is under a reduced pressure of up to 300 Torr.

4. The method of claim 1 wherein a dispersant for the filler is fed during the kneading step.

5. The method of claim 4 wherein the dispersant is one or more compound selected from silazane compounds and silanol-containing compounds.

6. The method of claim 5 wherein the dispersant is 1,1,1,3,3,3-hexamethyldisilazane.

7. The method of claim 5 wherein the dispersant is a compound of HO(SiR$^1_2$O)$_n$H wherein R$^1$ is a monovalent hydrocarbon group of 1 to 10 carbon atoms and n is an integer of 1 to 50.

8. The method of claim 1 wherein the filler is fumed silica, precipitated silica or a mixture thereof.

9. The method of claim 8 wherein the composition comprises 100 parts by weight of the organopolysiloxane and 10 to 130 parts by weight of the silica filler.

* * * * *